(12) United States Patent
Cao et al.

(10) Patent No.: US 10,776,334 B2
(45) Date of Patent: Sep. 15, 2020

(54) RANDOM WALKING AND CLUSTER-BASED RANDOM WALKING METHOD, APPARATUS AND DEVICE

(71) Applicant: ALIBABA GROUP HOLDING LIMITED, Grand Cayman (KY)

(72) Inventors: Shaosheng Cao, Hangzhou (CN); Xinxing Yang, Hangzhou (CN); Jun Zhou, Hangzhou (CN); Xiaolong Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/736,673

(22) Filed: Jan. 7, 2020

(65) Prior Publication Data

US 2020/0142875 A1    May 7, 2020

Related U.S. Application Data

(63) Continuation of application No. PCT/CN2018/104922, filed on Sep. 11, 2018.

(30) Foreign Application Priority Data

Oct. 10, 2017    (CN) .......................... 2017 1 0932631

(51) Int. Cl.
*G06F 16/00* (2019.01)
*G06F 16/22* (2019.01)
(Continued)

(52) U.S. Cl.
CPC .......... *G06F 16/2237* (2019.01); *G06F 16/27* (2019.01); *G06F 16/285* (2019.01); *G06F 16/906* (2019.01)

(58) Field of Classification Search
CPC ....... G06F 16/51; G06F 16/906; G06F 16/287
See application file for complete search history.

(56) References Cited

U.S. PATENT DOCUMENTS 6,549,896 B1    4/2003  Candan et al.
7,827,182 B1   11/2010  Panigraphy
(Continued)

FOREIGN PATENT DOCUMENTS

CN    101894123 A    11/2010
CN    103198177 B     7/2013
(Continued)

OTHER PUBLICATIONS

Gardner, Matt, et al. "Incorporating vector space similarity in random walk inference over knowledge bases." Proceedings of the 2014 conference on empirical methods in natural language processing (EMNLP). 2014.*

(Continued)

*Primary Examiner* — Nan Hutton
(74) *Attorney, Agent, or Firm* — Sheppard Mullin Richter & Hampton LLP (57) ABSTRACT

Embodiments of the present specification disclose random walking and a cluster-based random walking method, apparatus and device. A solution includes: obtaining information about each node included in graph data, generating, according to the information about each node, an index vector reflecting a degree value of a respective node, then generating an element vector reflecting an identifier of an adjacent node of the node, and generating a random sequence according to the index vector and the element vector, to implement random walks in the graph data. The solution is applicable to clusters and individual machines.

16 Claims, 5 Drawing Sheets

(51) Int. Cl.
*G06F 16/27* (2019.01)
*G06F 16/28* (2019.01)
*G06F 16/906* (2019.01)

(56) References Cited

U.S. PATENT DOCUMENTS

| | | |
|---|---|---|
| 8,073,832 B2 | 12/2011 | Gollapudi et al. |
| 8,122,419 B2 | 2/2012 | Elfadel et al. |
| 8,156,129 B2 | 4/2012 | Zhou et al. |
| 8,396,864 B1 | 3/2013 | Harinarayan et al. |
| 8,396,884 B2 | 3/2013 | Singh et al. |
| 8,639,703 B2 | 1/2014 | Harinarayan et al. |
| 8,849,830 B1 | 9/2014 | Srinivasan et al. |
| 8,856,047 B2 | 10/2014 | Chakrabarti et al. |
| 8,943,011 B2 | 1/2015 | Gong et al. |
| 9,135,308 B2 | 9/2015 | Bhalotia |
| 9,582,766 B2 | 2/2017 | Sadikov et al. |
| 9,704,262 B2 | 7/2017 | Baloch et al. |
| 10,304,244 B2 | 5/2019 | Chuang et al. |
| 10,521,435 B2 | 12/2019 | Balmin et al. |
| 2007/0203789 A1 | 8/2007 | Jain et al. |
| 2008/0097971 A1 | 4/2008 | Chen et al. |
| 2008/0275902 A1 | 11/2008 | Burges et al. |
| 2009/0070873 A1 | 3/2009 | McAfee et al. |
| 2010/0281022 A1 | 11/2010 | Gollapudi et al. |
| 2011/0035464 A1 | 2/2011 | Dolin et al. |
| 2012/0096042 A1 | 4/2012 | Brockett et al. |
| 2012/0278261 A1 | 11/2012 | Lin et al. |
| 2012/0330864 A1 | 12/2012 | Chakrabarti et al. |
| 2013/0151536 A1 | 6/2013 | Akoglu et al. |
| 2014/0317736 A1 | 10/2014 | Cao et al. |
| 2015/0032767 A1 | 1/2015 | Gao et al. |
| 2016/0232254 A1* | 8/2016 | Chehreghani ............ G06F 17/10 |
| 2017/0195188 A1 | 7/2017 | Bennett et al. |
| 2018/0137155 A1* | 5/2018 | Majumdar .......... G06F 16/2228 |
| 2019/0066054 A1 | 2/2019 | Kenthapadi et al. |
| 2019/0114373 A1 | 4/2019 | Subbian et al. |
| 2020/0004902 A1 | 1/2020 | Aimone et al. |
| 2020/0005120 A1 | 1/2020 | Aimone et al. |

FOREIGN PATENT DOCUMENTS

| | | |
|---|---|---|
| CN | 103699617 A | 4/2014 |
| CN | 104063507 A | 9/2014 |
| CN | 104158840 A | 11/2014 |
| CN | 104462374 A | 3/2015 |
| CN | 105659225 A | 6/2016 |
| CN | 105741175 A | 7/2016 |
| CN | 106777284 A | 5/2017 |
| CN | 106844426 A | 6/2017 |
| CN | 106991133 A | 7/2017 |
| CN | 107145977 A | 9/2017 |
| CN | 107179940 A | 9/2017 |
| CN | 107248095 A | 10/2017 |
| CN | 109934306 A | 6/2019 |
| EP | 2994826 B1 | 8/2019 |
| TW | 200420151 A | 10/2004 |
| TW | 200837584 A | 9/2008 |
| TW | 200925924 A | 6/2009 |
| TW | 201019143 A | 5/2010 |
| TW | 201439789 A | 10/2014 |
| WO | 2007100834 A2 | 9/2007 |
| WO | 2019178155 A1 | 9/2019 |

OTHER PUBLICATIONS

Yen, Luh, et al. "clustering using a random walk based distance measure." ESANN. 2005.*
Franti, Pasi, Olli Virmajoki, and Ville Hautamaki. "Fast agglomerative clustering using a k-nearest neighbor graph." IEEE transactions on pattern analysis and machine intelligence 28.11 (2006): 1875-1881.*
Taiwanese Search Report for Taiwanese Application No. 107128019, dated Jan. 21, 2020, 1 page.
First Search Report for Chinese Application No. 201710932631.0, dated Dec. 24, 2019, 2 pages.
First Office Action for Chinese Application No. 201710932631.0, dated Jan. 3, 2020, 7 pages.
Supplementary Search Report for Chinese Application No. 201710932631.0, dated Jan. 15, 2020, 1 page.
International Search Report and Written Opinion of the International Searching Authority for International Application No. PCT/CN2018/104922, with partial machine English translation, dated Nov. 28, 2018, 8 pages.
Bian, Mengyang et al., "Recommendation Method Based on Random Walk on Graph Integrated with FP-Growth", Computer Science, vol. 6, No. (44), pp. 232-236, Jun. 2017.
First Search Report for Taiwanese Application No. 107128022, dated Jun. 11, 2019, 1 page.
First Search Report for Chinese Application No. 201710932612.8, dated Jan. 2, 2020, 1 page.
First Office Action for Chinese Application No. 201710932612.8, dated Jan. 10, 2020, 8 pages.
Supplementary Search Report for Chinese Application No. 201710932612.8, dated Feb. 13, 2020, 1 page.
International Search Report and Written Opinion of the International Searching Authority for International Application No. PCT/CN2018/102748, with partial machine English translation, dated Oct. 31, 2018, 8 pages.
Second Office Action for Chinese Application No. 201710932631.0 dated Feb. 21, 2020.
Second Office Action for Chinese Application No. 201710932612.8 dated Feb. 18, 2020.
Non-Final Office Action for U.S. Appl. No. 16/736,603 dated Mar. 17, 2020.
Search Report for European Application No. 18865577.3 dated Apr. 9, 2020.
International Preliminary Report on Patentability Chapter I for PCT Application No. PCT/CN2018/104922 dated Apr. 23, 2020.
International Preliminary Report on Patentability Chapter I for PCT Application No. PCT/CN2018/102748 dated Apr. 23, 2020.
Search Report for European Application No. 18865436.2 dated Jul. 31, 2020.
Qin Liu et al., "PowerWalk: Scalable Personalized PageRank via Random Walks with Vertex-Centric Decomposition," Aug. 22, 2016.
Aapo Kyrola, "DrunkardMob: billions of random walks on just a PC," Proceedings of the 7th ACM Conference on Recommender Systems, Jan. 1, 2013.
Anonymous, "Adjacency list—Wikipedia," Feb. 8, 2016.

* cited by examiner

RANDOM WALKING AND CLUSTER-BASED RANDOM WALKING METHOD, APPARATUS AND DEVICE

CROSS REFERENCE TO RELATED APPLICATIONS

This application is a continuation application of International Application No. PCT/CN2018/104922, filed on Sep. 11, 2018, which claims priority to and benefits of Chinese Patent Application No. 201710932631.0 filed on Oct. 10, 2017. The contents of the above-referenced applications are incorporated herein by reference in their entirety.

TECHNICAL FIELD

The present specification relates to the field of computer software technologies, and in particular, to random walking and a cluster-based random walking method, apparatus and device.

BACKGROUND

With the rapid development of computer and Internet technologies, many services can be performed on the Internet. Graph computing is a common means for processing social online services.

For example, for identification of fraud on accounts in a social risk control service, each user is considered as a node. If there is a transfer relationship between two users, a line is present between two corresponding nodes. The line may be directionless, or may be directed according to a transfer direction. In this way, graph data including a plurality of nodes and lines may be obtained, to perform graph computing based on the graph data to implement risk control.

A random walk algorithm is a relatively basic and important part of graph computing, and provides support for an upper-level complex algorithm. In existing technologies, the following random walk algorithm is generally used: Any node included in graph data is read in a database, any adjacent node of the node is further read in the database, to implement random walking in the graph data.

Based on the existing technologies, a more efficient random walking solution applicable to large-scale graph data is needed.

SUMMARY

Embodiments of the present specification provide random walking and a cluster-based random walking method, apparatus and device, to resolve the following technical problem: a more efficient random walking solution applicable to large-scale graph data is needed.

To resolve the foregoing technical problem, the embodiments of the present specification are implemented as follows:

An embodiment of the present specification provides a cluster-based random walking method. The method includes: obtaining, by a cluster, information about each node included in graph data. An index vector is generated according to the information about each node, where an element in the index vector includes an accumulated value of a degree of one or more nodes. An element vector is generated according to the index vector, where an element in the element vector includes an identifier of an adjacent node of the node. A random sequence is generated according to the index vector and the element vector, where the random sequence reflects random walks in the graph data.

An embodiment of the present specification provides a random walking method. The method includes obtaining an index vector that is generated according to information about each node included in graph data and an element vector that is generated according to the index vector. A random sequence is generated according to the index vector and the element vector, where the random sequence reflects random walks in the graph data. An element in the index vector includes an accumulated value of a degree of one or more nodes, and an element in the element vector includes an identifier of an adjacent node of a respective node.

An embodiment of the present specification provides a cluster-based random walking apparatus. The apparatus belongs to a cluster and includes: an obtaining module, for obtaining information about each node included in graph data; a first generation module, for generating an index vector according to the information about each node, where an element in the index vector includes an accumulated value of a degree of one or more nodes; a second generation module, for generating an element vector according to the index vector, where an element in the element vector includes an identifier of an adjacent node of a respective node; and a third generation module, for generating a random sequence according to the index vector and the element vector, where the random sequence reflects random walks in the graph data.

An embodiment of the present specification provides a random walking apparatus. The apparatus includes: an obtaining module, for obtaining an index vector that is generated according to information about each node included in graph data and an element vector that is generated according to the index vector; and a generation module, for generating a random sequence according to the index vector and the element vector, where the random sequence reflects random walks in the graph data. An element in the index vector includes an accumulated value of a degree of one or more nodes, and an element in the element vector includes an identifier of an adjacent node of a respective node.

An embodiment of the present specification provides a cluster-based random walking device. The device belongs to a cluster, and includes at least one processor and a memory communicatively connected to the at least one processor. The memory stores an instruction executable by the at least one processor, and the instruction is executed by the at least one processor to enable the at least one processor to: obtain information about each node included in graph data; generate an index vector according to the information about each node, where an element in the index vector includes an accumulated value of a degree of one or more nodes; generate an element vector according to the index vector, where an element in the element vector includes an identifier of an adjacent node of the node; and generate a random sequence according to the index vector and the element vector, where the random sequence reflects random walks in the graph data.

An embodiment of the present specification provides a random walking device. The device includes at least one processor and a memory communicatively connected to the at least one processor. The memory stores an instruction executable by the at least one processor, and the instruction is executed by the at least one processor to enable the at least one processor to: obtain an index vector that is generated according to information about each node included in graph data and an element vector that is generated according to the index vector; and generate a random sequence according to the index vector and the element vector, where the random sequence reflects random walks in the graph data. An element in the index vector includes an accumulated value of a degree of one or more nodes, and an element in the element vector includes an identifier of an adjacent node of a respective node.

An embodiment of the present specification provides a non-transitory computer-readable storage medium. The non-transitory computer-readable storage medium stores instructions which, when executed by a processor, cause the processor to perform operations including: obtaining information about each node included in graph data; generating an index vector according to the information about each node, wherein an element in the index vector comprises an accumulated value of a degree of one or more nodes; generating an element vector according to the index vector, wherein an element in the element vector comprises an identifier of an adjacent node of the node; and generating a random sequence according to the index vector and the element vector, wherein the random sequence reflects random walks in the graph data.

The foregoing at least one technical solution used in the embodiments of the present specification can achieve the following beneficial effects: a database originally storing the graph data is accessed less, the index vector and the element vector are independent of the database after generated, and an adjacent node of a node can be quickly retrieved by using the index vector and the element vector. The solution is applicable to large-scale graph data and is relatively efficient, and can be more efficient when implemented based on a cluster.

BRIEF DESCRIPTION OF THE DRAWINGS

To describe the technical solutions in the embodiments of this specification or in the prior art more clearly, the following briefly introduces the accompanying drawings required for describing the embodiments or the prior art. Apparently, the accompanying drawings in the following description show merely some embodiments of this specification, and a person of ordinary skill in the art may still derive other drawings from these accompanying drawings without creative efforts.

DETAILED DESCRIPTION OF THE EMBODIMENTS

Embodiments of the present specification provide random walking and a cluster-based random walking method, apparatus, and device.

To enable a person skilled in the art to better understand the technical solutions in this specification, the technical solutions of the embodiments of this specification will be described clearly and thoroughly below with reference to the accompanying drawings of the embodiments of this specification. Apparently, the described embodiments are merely some rather than all of the embodiments of this application. Other variations may be obtained by a person of ordinary skill in the art based on the embodiments of this specification without creative efforts and shall fall within the protection scope of this application.

A solution of the present specification is applicable to clusters and individual machines. Cluster-based processing of large-scale graph data is more efficient because a task can be split and a plurality of machines in the cluster can concurrently execute task parts assigned to them. The following embodiments are mainly described based on a cluster scenario.

The solution may involve one or more clusters. For example, two clusters are involved in FIG. 1.

Figure 1:
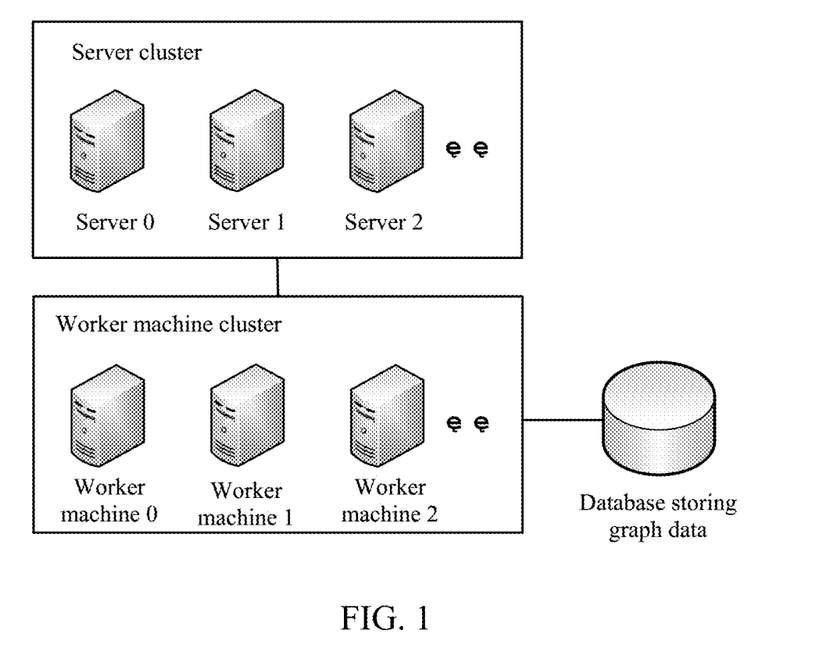
FIG. 1 is a schematic diagram of an overall architecture of a solution of the present specification in an actual application scenario.

FIG. 1 is a schematic diagram of an overall architecture of a solution of the present specification in an actual application scenario. The overall architecture mainly includes three parts: a server cluster, a worker machine cluster, and a database. The database stores graph data for the cluster to read. The server cluster cooperates with the worker machine cluster, to implement random walking in the graph data according to data read from the database.

The architecture in FIG. 1 is not unique but an example. For example, the solution may involve one cluster, and the cluster includes at least one scheduler and a plurality of worker machines. Another solution may involve one worker machine cluster and one server. Machines involved in the solutions cooperate with each other to implement random walking in the graph data.

The solution of the present specification is described below in detail.

Figure 2:
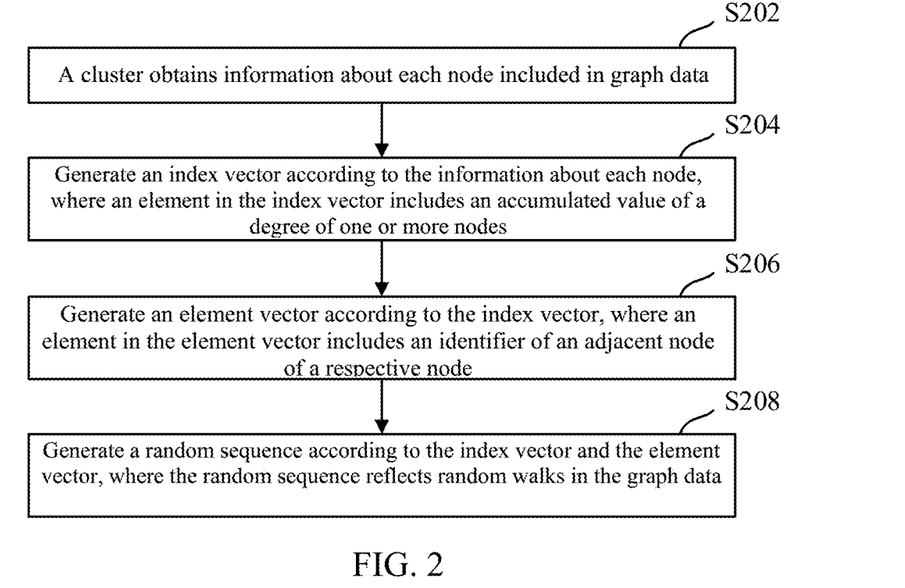
FIG. 2 is a flowchart of a cluster-based random walking method, according to an embodiment of the present specification.

FIG. 2 is a schematic flowchart of a cluster-based random walking method, according to an embodiment of the present specification. Each step in FIG. 2 is performed by at least one machine (or a program on a machine) in a cluster, and different steps may be performed by different entities.

A procedure in FIG. 2 includes the following steps:

In S202, the cluster obtains information about each node included in graph data.

In embodiments of the present specification, information about a node may refer to one or more pieces of information, such as a degree value of the node and an identifier of a node (adjacent node) adjacent/next to the node. The information about each node may be obtained at one time, or may be obtained at a plurality of times, and a different type of information may be obtained at different times. In the latter manner, for example, a degree value of each node may be obtained first to generate an index vector, and then an identifier of an adjacent node of each node is obtained to generate an element vector.

Generally, the original graph data is stored in a database. In this case, the information about each node is read by accessing the database. To avoid repeatedly reading data from the database and increasing the burden of the database, a plurality of machines in the cluster may respectively read information about different nodes. Further, the plurality of machines may concurrently access the database, to quickly obtain the information about the nodes.

For example, each worker machine in a worker machine cluster may concurrently read information about respective nodes from the database, and the information about each node read by the worker machine cluster is further synchronized to a server cluster for processing.

In S204, an index vector is generated according to the information about each node, where an element in the index vector includes an accumulated value of a degree of one or more nodes.

In S206, an element vector is generated according to the index vector, where an element in the element vector includes an identifier of an adjacent node of the node.

In the embodiments of the present specification, each node corresponds to at least one element in the index vector, and corresponds to at least one element in the element vector.

Nodes are in a certain order according to specific information about the nodes. For example, the specific information may be identifiers of the nodes. In one embodiment, a number is used as an identifier of a node, and the order of the nodes is defined by magnitudes of the identifiers of the nodes. For example, assuming that the identifiers of the nodes are non-negative integers and start from 0, an identifier of a node ranking first in the order is 0, an identifier of a node ranking second is 1, and so on. The following embodiments are described based on the definition in this example.

In embodiments of the present specification, the index vector is generated according to a degree value of each node. The degree value of a respective node is equal to a quantity of nodes adjacent to the respective node. The element vector is obtained by inserting an identifier of an adjacent node of each node in an empty vector according to an element in the index vector.

An accumulated value of degree values corresponding to any node (calculated as a sum of degree values of the node and all nodes before the node) can be quickly retrieved according to the index vector. An identifier of any adjacent node of any node can be quickly retrieved according to the element vector, to facilitate efficient random walking in the graph data.

In embodiments of the present specification, each vector is generally implemented based on an array. To better adapt to a subsequent possible change (for example, addition or deletion of a node, or addition or deletion of a line) of the graph data, the array is preferably a dynamic array, so that a quantity of elements in the vector can be conveniently adjusted according to the change of the graph data, instead of generating a new complete vector.

The array is not unique but a data structure example for implementing a vector. For example, a vector may alternatively be implemented by using other data structures such as a linked list.

In S208, a random sequence is generated according to the index vector and the element vector, where the random sequence reflects random walks in the graph data.

In embodiments of the present specification, the random sequence is a sequence including identifiers of a plurality of nodes. An order of the identifiers in the random sequence is a random walking order. A maximum length of the random sequence is generally determined by a predetermined quantity of random walking steps.

After the index vector and the element vector are obtained, step S208 may be independently performed a plurality of times, to obtain a plurality of independent random sequences. For example, each worker machine generates one or more random sequences according to the index vector and the element vector.

Using the method in FIG. 2, the database storing the graph data is accessed less frequently. The index vector and the element vector are independent of the database after being generated. An adjacent node of a node can be quickly retrieved by using the index vector and the element vector. The method is applicable to large-scale graph data and is efficient, and can be more efficient as implemented based on a cluster.

Based on the method in FIG. 2, embodiments of the present specification further provide some specific implementations and extended solutions of the method. The following description is provided by using the architecture in FIG. 1 as an example.

In embodiments of the present specification, the cluster may include a server cluster and a worker machine cluster. For S202, the obtaining, by the cluster, information about each node included in graph data may include: reading, by the worker machine cluster from the database, a degree value of each node included in the graph data, where each worker machine reads degree values of some nodes; and reading, by each worker machine according to an identifier of a node whose degree value is read by the worker machine, an identifier of an adjacent node of the node from the database.

For example, it is assumed that there are five nodes with identifiers 0 to 4 and degree values 1, 2, 3, 2, and 2 stored in the database. The worker machine cluster includes a worker machine 0, a worker machine 1, and a worker machine 2. Each worker machine reads degree values of some nodes from the database. For example, the worker machine 0 reads the degree values 1 and 2 of the node 0 and the node 1; the worker machine 1 reads the degree values 3 and 2 of the node 2 and the node 3; and the worker machine 2 reads the degree value 2 of the node 4.

In embodiments of the present specification, each worker machine reads a data part rather than the complete data, and a device such as the server cluster, a scheduler, or a single server integrates data read by the worker machines, to obtain the complete data represented in a predetermined format (for example, a vector) for subsequent calculation.

Assuming that the server cluster performs the integration, for step S204, the generating an index vector according to the information about each node may include: synchronizing, from the worker machine cluster to the server cluster, the degree value of each node to the server cluster; generating, by the server cluster, a degree vector according to an identifier and the degree value of each node, where an element in the degree vector includes the degree value of the node; and generating, by the server cluster, an index vector according to the degree vector through accumulation calculation. An element in the index vector is equal to a sum of a corresponding element in the degree vector and all elements before the corresponding element in the degree vector.

Further, the server cluster may synchronize the index vector to each worker machine for subsequent calculation.

Figure 3:
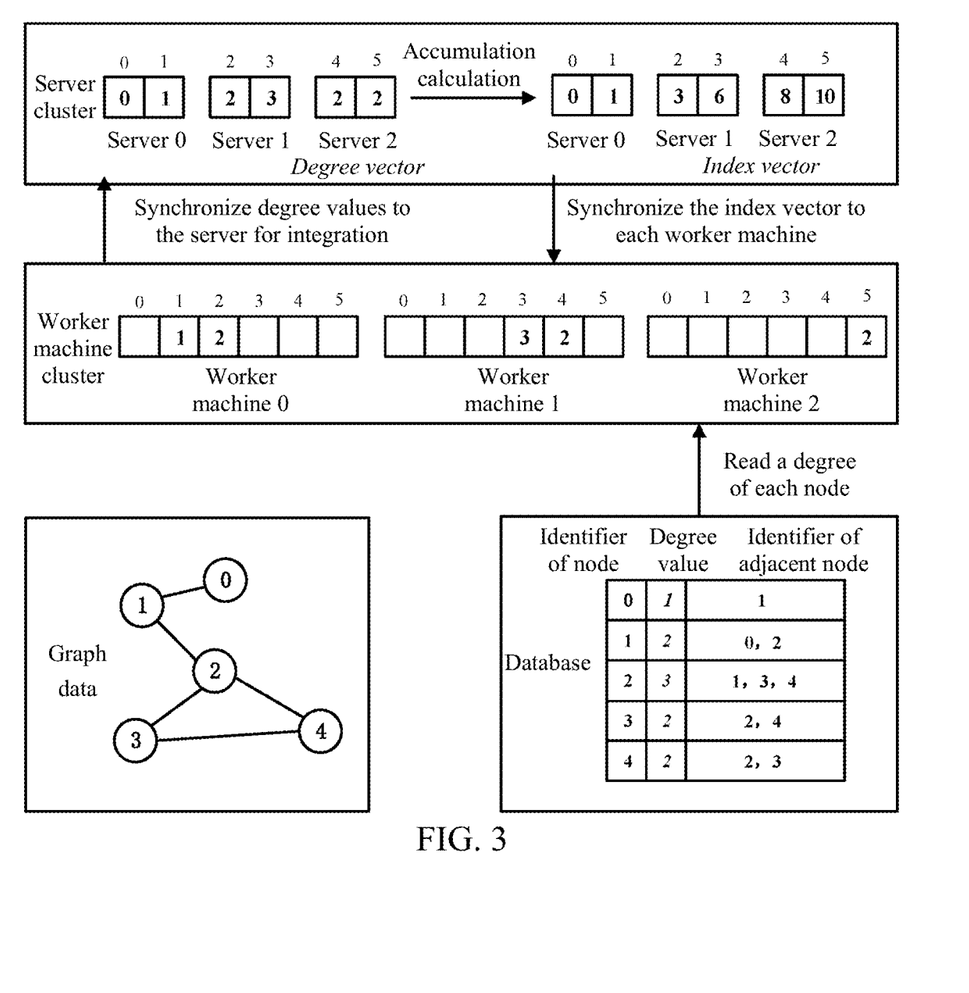
FIG. 3 is a flowchart of cluster-based index vector generation in an actual application scenario, according to an embodiment of the present specification.

A description is provided based on the foregoing example with reference to FIG. 3. FIG. 3 is a flowchart for generating a cluster-based index vector in an actual application scenario, according to an embodiment of the present specification.

In FIG. 3, a data table in the database records a degree value of each node and an identifier of an adjacent node of the node using an identifier of the node as a primary key. An adjacent node of a node 0 is a node 1. Adjacent nodes of the node 1 are the node 0 and a node 2. Adjacent nodes of the node 2 are the node 1, a node 3, and a node 4. Adjacent nodes of the node 3 are the node 2 and the node 4. Adjacent nodes of the node 4 are the node 2 and the node 3. As described above, worker machines 0 to 2 preferably may concurrently read degree values of some nodes from the database. The read degree values are represented in an order of the corresponding nodes.

Each worker machine obtains a part of a degree vector according to the degree values read by the worker machine. In the degree vector, a start element is 0 by default (for ease of subsequent calculation), and each element thereafter may record a degree value of a node in a node order. It should be noted that, the degree vector is an example storage format of degree values, and does not limit the present application.

The worker machine cluster synchronizes all read degree values to the server cluster for integration, to obtain a degree vector (0, 1, 2, 3, 2, 2). In FIG. 3, it is assumed that the server cluster includes servers 0 to 2, and that a degree vector (and the servers) may split a task to improve processing efficiency.

Further, an index vector is generated by performing accumulation calculation on the elements in the degree vector. For example, a zeroth element of the index vector is equal to a zeroth element of the degree vector, that is, 0. A first element of the index vector is equal to a sum of the zeroth and first elements of the degree vector, that is, 0+1=1. A second element of the index vector is equal to a sum of the zeroth, first, and second elements of the degree vector, that is, 0+1+2=3. A third element of the index vector is equal to a sum of the zeroth, first, second, and third elements of the degree vector, that is, 0+1+2+3=6; and so on to obtain the index vector (0, 1, 3, 6, 8, 10).

After the index vector is generated, the server cluster synchronizes the index vector to each worker machine.

The foregoing describes index vector generation, and the following further describes element vector generation.

In embodiments of the present specification, for step S206, the generating an element vector according to the index vector may specifically include: performing, by each worker machine, retrieval according to the index vector, and correspondingly performing, according to a retrieved identifier of a node, an array element insertion operation for an identifier of an adjacent node of the node to generate a part of the element vector; synchronizing, from the worker machine cluster to the server cluster, each part of the element vector; and generating, by the server cluster, the element vector according to each part of the element vector.

Each worker machine retrieves, according to the index vector, an identifier of a node, and inserts an array element in an array for an identifier of an adjacent node of the node to generate a part of the element vector.

As explained above, similar to degree vector generation, worker machines obtain parts of the element vector, and synchronize the parts to the server cluster for integration to obtain the element vector.

Elements in the element vector are correspondingly arranged based on an order of elements in the index vector, and may be specifically arranged in a plurality of manners. For example, an identifier of an adjacent node of each node may be used as an element to be arranged in the element vector in order. For example, an identifier of an adjacent node of each node may be stored in a linked list, and each linked list is used as an element to be arranged in the element vector in order. The arrangement may be implemented through an array element insertion operation.

In this way, a multi-level indexing can be implemented with high retrieval efficiency. An identifier of a node is indexed to a corresponding element in the index vector, and the corresponding element in the index vector is indexed to a corresponding element in the element vector. The corresponding element in the element vector includes an identifier of at least one adjacent node of a respective node. In this way, random walking from the node to the at least one adjacent node is implemented.

Further, after generating the element vector, the server cluster synchronizes the element vector to each worker machine, so that each worker machine may independently generate a random sequence according to the index vector and the element vector.

Figure 4:
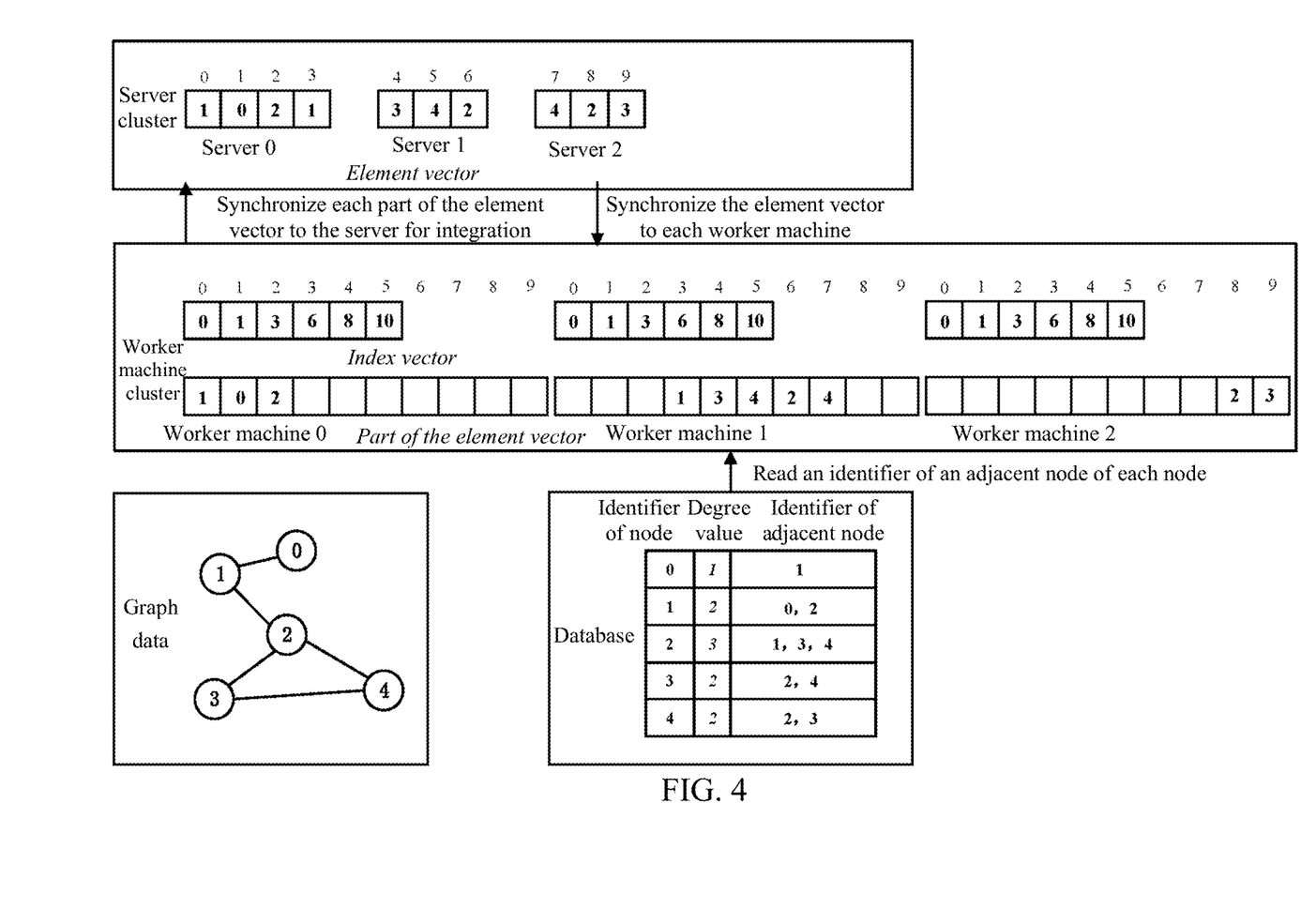
FIG. 4 is a flowchart of cluster-based element vector generation in an actual application scenario, according to an embodiment of the present specification.

With reference to FIG. 4, a further description is provided based on the example of FIG. 3. FIG. 4 is a flowchart of cluster-based element vector generation in an actual application scenario, according to an embodiment of the present specification.

In FIG. 4, each worker machine reads an identifier of adjacent nodes of some nodes. This read process may be performed together with the process of reading degree values of the nodes, or may be performed after the index vector is generated.

The worker machine 0 reads the degree values of the node 0 and the node 1, and correspondingly reads identifiers of adjacent nodes of the two nodes, which may be represented by a vector (1, 0, 2), which is a start part of the element vector. The worker machine 1 reads the degree values of the node 2 and the node 3, and correspondingly reads identifiers of adjacent nodes of these two nodes, which may be represented by a vector (1, 3, 4, 2, 4), which constitutes a middle part of the element vector. The worker machine 2 reads the degree value of the node 4, and correspondingly reads the identifier of the adjacent node of the node, which may be represented by a vector (2, 3), which constitutes an end part of the element vector.

The worker machine cluster synchronizes each part of the element vector to the server cluster for integration to obtain an element vector (1, 0, 2, 1, 3, 4, 2, 4, 2, 3). The server cluster then synchronizes the element vector to each worker machine.

In embodiments of the present specification, for step S208, the generating a random sequence according to the index vector and the element vector may include: (a) randomly determining, by the worker machine, an identifier in identifiers of nodes as an identifier of a target node; (b) performing retrieval and calculation according to the identifier of the target node and the index vector to obtain a degree value of the target node; (c) randomly determining a non-negative integer less than the degree value of the target node, to represent a (non-negative integer)$^{th}$ adjacent node of the target node; (d) calculating an identifier of the adjacent node of the target node according to the non-negative integer and the element vector; and (e) iterating (b), (c), and (d), using the adjacent node as a next target node, to generate a random sequence including identifiers of target nodes obtained in sequence.

As described above, random walking is implemented through multi-level retrieval. In the foregoing paragraphs, the first-level retrieval is performed in the index vector according to the determined identifier of the target node, to obtain the degree value of the target node; and then the non-negative integer (used to select an adjacent node of the node) is determined according to the degree value. The second-level retrieval is performed in the element vector according to the non-negative integer, to obtain the identifier of the adjacent node of the target node. In this way, random walking from the target node to the adjacent node may be implemented.

Figure 5:
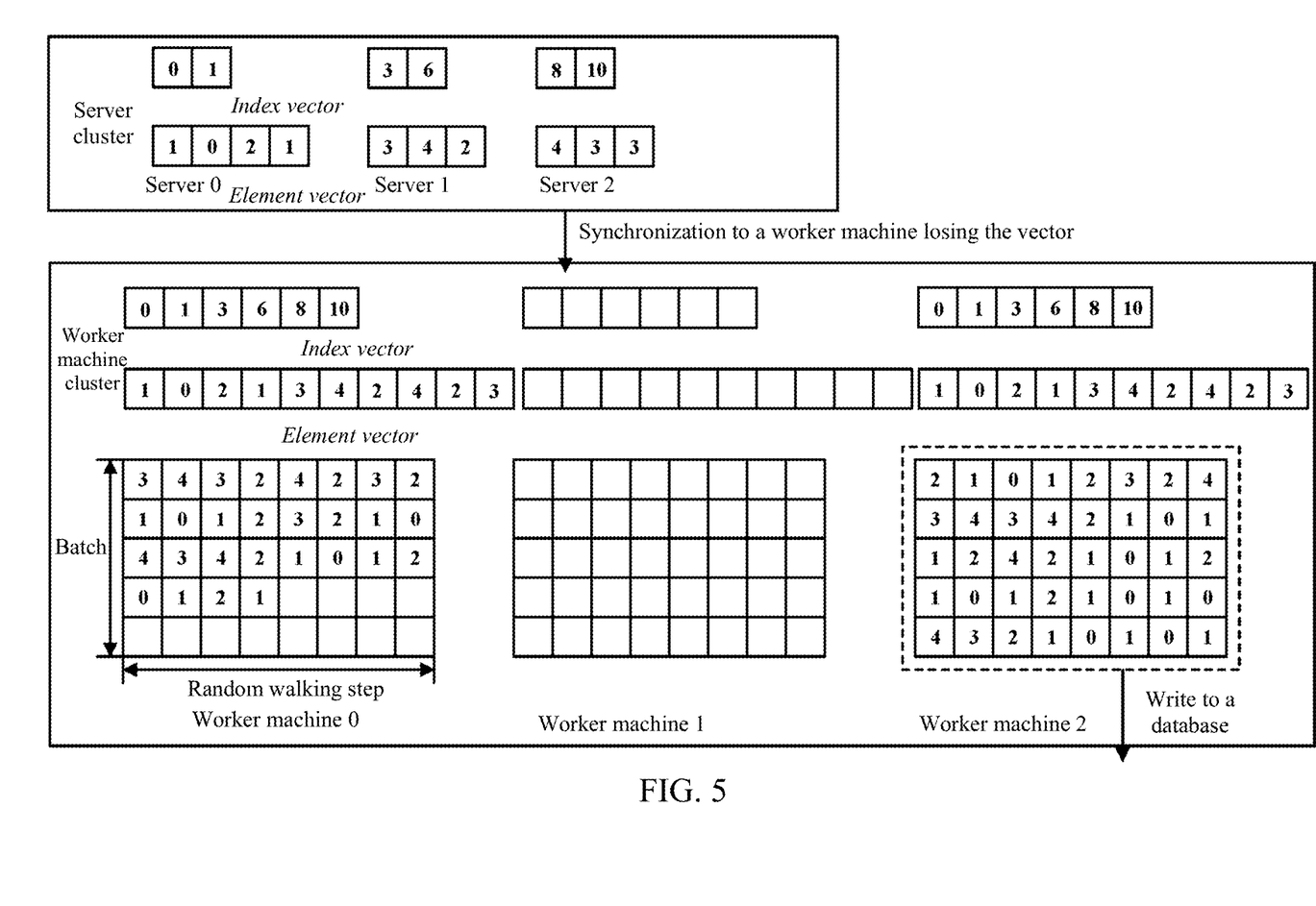
FIG. 5 is a flowchart of cluster-based random sequence generation in an actual application scenario, according to an embodiment of the present specification.

A further description based on the example of FIG. 3 and FIG. 4 is provided with reference to FIG. 5. FIG. 5 is a flowchart of cluster-based random sequence generation in an actual application scenario, according to an embodiment of the present specification.

The graph data includes N nodes in total, an identifier of an $n^{th}$ node is n, and n starts from 0. For step S208, the generating a random sequence according to the index vector and the element vector may include the following operations: (a) generating, by a worker machine, any integer belonging to [0, N−1] as an identifier i of a target node; (b) performing retrieval and calculation according to a formula dgr[i]=idx[i+1]−idx[i] to obtain a degree value $D_0$ of the target node, where dgr[i] represents the degree value of the node with the identifier i, and idx represents the index vector; (c) generating any integer j belonging to [0, $D_0$−1], to represent a $j^{th}$ adjacent node of the target node; (d) calculating an identifier of the adjacent node according to a formula adj[i,j]=elem [idx[i]+j], where adj[i,j] represents the identifier of the $j^{th}$ adjacent node of the node with the identifier i, and elem represents the element vector; and (e) iterating (b), (c), and (d), using the adjacent node as a target node, to generate a random sequence including identifiers of target nodes obtained in sequence.

In FIG. 5, N equals to five (N=5). Assuming that the generated integer belonging to [0, N−1=4] is i=2, that is, the target node is the node 2, according to the formula dgr[2]=idx[2+1]−idx[2]=6−3=3. $D_0$=3. Assuming that the generated integer belonging to [0, $D_0$−1=2] is j=1, according to the formula adj[2,1]=elem [idx[2]+1]=elem [3+1]=3, a first adjacent node of the target node is the node 3. That is, random walking from the node 2 to the node 3 can be implemented, and then the node 3 is used as a next target node for iterative calculation, to continue the random walking. In this way, identifiers of a plurality of nodes sequentially included in the random walking form a random sequence.

In FIG. 5, a quantity of random walking steps is preset to 8, and a quantity of batches is preset to 5. A matrix may be used to represent the calculation results. For example, the quantity of random walking steps is a quantity of columns of the matrix, and the quantity of batches is a quantity of rows of the matrix. In this way, each row of the matrix may store a random sequence.

The quantity of random walking steps defines a maximum length of a random sequence. Every time a random sequence reaches the maximum length, a next random sequence independent of the prior random sequence may be generated.

The quantity of batches defines a maximum quantity of random sequences that have been generated by each worker machine but not yet written to the database. When the maximum quantity is reached, the worker machine may write a plurality of random sequences that have been generated by the worker machine to the database (in a form of a corresponding matrix). For example, in FIG. 5, when a plurality of random sequences that currently have been generated by the worker machine 2 but not yet written reaches the maximum quantity 5, the corresponding matrix may be written to the database.

For example, a first random sequence (3, 4, 3, 2, 4, 2, 3, 2) generated by the worker machine 0 in FIG. 5 represents a process of random walking through the following nodes: the node 3, the node 4, the node 3, the node 2, the node 4, the node 2, the node 3, and the node 2.

Further, a threshold may be preset, to limit a maximum total quantity of random sequences generated by the entire worker machine cluster. When the preset threshold is reached, each worker machine may stop generating a random sequence.

In addition, during actual applications, some worker machines in the worker machine cluster may become abnormal, and lose the index vector and/or the element vector obtained through synchronization with the server cluster. For example, if the worker machines store the obtained vector only in a memory, data in the memory may be lost upon crash. In this case, when recovered to normal, the worker machines may re-obtain the lost vector from the server cluster. The worker machine 1 in FIG. 5 is shown for this case.

The foregoing mainly describes the solution of the present specification based on a cluster scenario. The solution of the present specification is also applicable to other scenarios than the cluster scenario. For example, based on the same idea, an embodiment of the present specification further provides a random walking method, as shown in FIG. 6.

Figure 6:
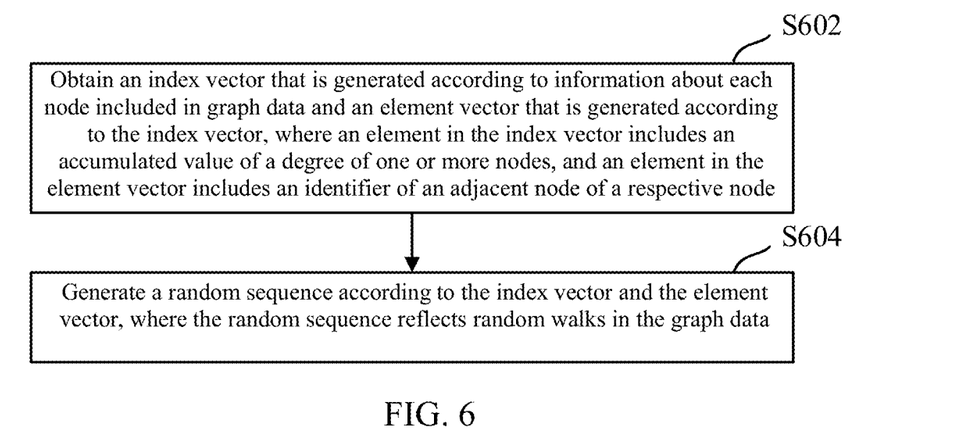
FIG. 6 is a flowchart of a random walking method, according to an embodiment of the present specification.

A procedure in FIG. 6 may be performed by a single computing device, or may be a plurality of computing devices. The procedure includes the following steps.

In S602, a computing device obtains an index vector that is generated according to information about each node included in graph data and an element vector that is generated according to the index vector, where an element in the index vector includes an accumulated value of a degree of one or more nodes, and an element in the element vector includes an identifier of an adjacent node of a respective node.

In S602, an entity for generating the index vector and the element vector is not limited in the present application. Generally, as long as the graph data is not changed, the index vector and the element vector that are generated according to the graph data may be repeatedly used.

In S604, the computer device generates a random sequence according to the index vector and the element vector, where the random sequence reflects random walks in the graph data.

Figure 7:
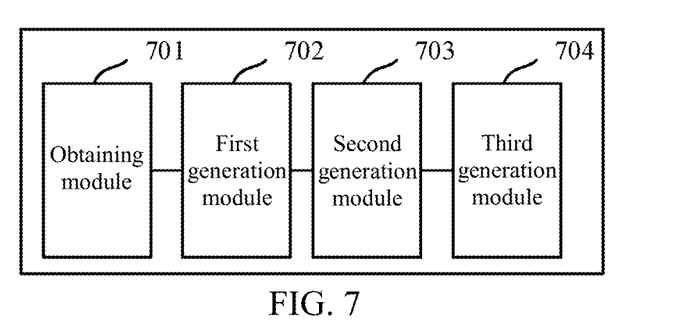
FIG. 7 is a schematic structural diagram of a cluster-based random walking apparatus corresponding to FIG. 2, according to an embodiment of the present specification.
Figure 8:
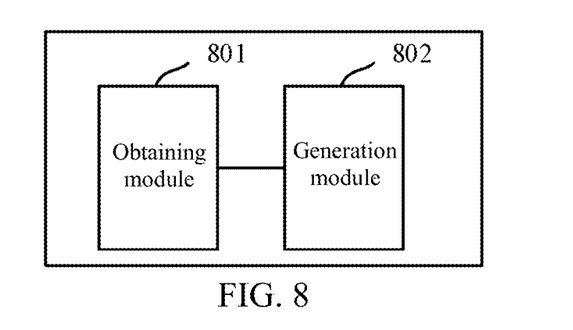
FIG. 8 is a schematic structural diagram of a random walking apparatus corresponding to FIG. 6, according to an embodiment of the present specification.

Based on the same idea, embodiments of the present specification further provide apparatuses corresponding to the foregoing methods, as shown in FIG. 7 and FIG. 8.

FIG. 7 is a schematic structural diagram of a cluster-based random walking apparatus corresponding to FIG. 2, according to an embodiment of the present specification. The apparatus belongs to a cluster, and includes an obtaining module 701, a first generation module 702, a second generation module 703, and a third generation module 704.

The obtaining module 701 is configured for obtaining information about each node included in graph data.

The first generation module 702 is configured for generating an index vector according to the information about each node, where an element in the index vector includes an accumulated value of a degree of one or more nodes.

The second generation module 703 is configured for generating an element vector according to the index vector, where an element in the element vector includes an identifier of an adjacent node of the node.

The third generation module 704 is configured for generating a random sequence according to the index vector and the element vector, where the random sequence reflects random walks in the graph data.

In some embodiments, the cluster includes a server cluster and a worker machine cluster such that the obtaining, by the obtaining module 701, information about each node included in graph data includes: reading, by the worker machine cluster from a database, a degree value of each node included in the graph data, where each worker machine reads degree values of respective nodes; and reading, by each worker machine according to an identifier of a node having a degree value that is read by the worker machine, an identifier of an adjacent node of the node from the database.

In some embodiments, the generating, by the first generation module 702, an index vector according to the information about each node includes: synchronizing, from the worker machine cluster to the server cluster, the degree value of each node; generating, by the server cluster, the degree vector according to an identifier and the degree value of each node, where an element in the degree vector includes a respective degree value of a respective node; and generating, by the server cluster, an index vector according to the degree vector through accumulation calculation, where an element in the index vector is equal to a sum of a corresponding element of the elements in the degree vector and all elements before the corresponding element.

In some embodiments, the generating, by the second generation module 703, an element vector according to the index vector specifically includes: retrieving, by each worker machine according to the index vector, an identifier of a node, and inserting an array element in an array for an identifier of an adjacent node of the node to generate a part of the element vector; synchronizing, from the worker machine cluster to the server cluster, each part of the element vector; and generating, by the server cluster, the element vector according to each part of the element vector.

In some embodiments, before the third generation module 704 generates the random sequence according to the index vector and the element vector, the server cluster synchronizes/sends the index vector and the element vector to each worker machine.

In some embodiments, the generating, by the third generation module 704, a random sequence according to the index vector and the element vector includes: randomly determining, by the worker machine, an identifier of nodes as an identifier of a target node; performing retrieval and calculation according to the identifier of the target node and the index vector to obtain a degree value of the target node; randomly determining a non-negative integer less than the degree value of the target node, to represent a (non-negative integer)$^{th}$ adjacent node of the target node; calculating an identifier of the adjacent node of the target node according to the non-negative integer and the element vector; and iterating the performing retrieval and calculation, the randomly determining, and the calculating, using the adjacent node as a target node, to generate a random sequence including identifiers of target nodes obtained in sequence.

In some embodiments, the graph data includes N nodes in total, an identifier of an n$^{th}$ node is n, and n starts from 0. The generating, by the third generation module 704, a random sequence according to the index vector and the element vector includes: generating, by the worker machine, any integer belonging [0, N−1] to as an identifier of a target node; performing retrieval and calculation according to a formula dgr[i]=idx[i+1]−idx[i] to obtain a degree value $D_0$ of the target node, where dgr[i] represents the degree value of the node with the identifier i, and idx represents the index vector; generating any integer [0, $D_0$−1] belonging to j, to represent a j$^{th}$ adjacent node of the target node; calculating an identifier of the adjacent node according to a formula adj[i,j]=elem [idx[i]+j], where adj[i,j] represents the identifier of the i$^{th}$ adjacent node of the node with the identifier j, and elem represents the element vector; and iterating the performing retrieval and calculation, the generating, and the calculating, using the adjacent node as a target node, to generate a random sequence including identifiers of target nodes obtained in sequence.

In some embodiments, the generating, by the worker machine, a random sequence including identifiers of target nodes obtained in sequence specifically includes: when a total quantity of the target nodes obtained in sequence reaches a preset quantity of random walking steps, generating, by the worker machine, the random sequence including the identifiers of the target nodes obtained in sequence.

In some embodiments, the generating, by the third generation module 704, a random sequence specifically includes: generating, by each worker machine, a random sequence until a total quantity of generated random sequences reaches a specified threshold.

In some embodiments, if the index vector and/or the element vector is locally lost/unavailable in a respective worker machine, the respective worker machine may re-obtain the index vector and/or the element vector from the server cluster.

FIG. 8 is a schematic structural diagram of a random walking apparatus corresponding to FIG. 6, according to an embodiment of the present specification. The apparatus includes an obtaining module 801 and a generation module 802.

The obtaining module 801 is configured for obtaining an index vector that is generated according to information about each node included in graph data and an element vector that is generated according to the index vector.

The generation module 802 is configured for generating a random sequence according to the index vector and the element vector, where the random sequence reflects random walks in the graph data, where an element in the index vector includes an accumulated value of a degree of one or more nodes, and an element in the element vector includes an identifier of an adjacent node of a respective node.

Based on the same idea, an embodiment of the present specification further provides a cluster-based random walking device corresponding to FIG. 2. The device belongs to a cluster, and includes at least one processor and a memory communicatively connected to the at least one processor. The memory stores an instruction executable by the at least one processor. The at least one processor is configured to execute the instruction to: obtain information about each node included in graph data; generate an index vector according to the information about each node, where an element in the index vector includes an accumulated value of a degree of one or more nodes; generate an element vector according to the index vector, where an element in the element vector includes an identifier of an adjacent node of the node; and generate a random sequence according to the index vector and the element vector, where the random sequence reflects random walks in the graph data.

Based on the same idea, an embodiment of the present specification further provides a random walking device corresponding to FIG. 6. The device includes at least one processor and a memory communicatively connected to the at least one processor. The memory stores an instruction executable by the at least one processor. The at least one processor is configured to execute the instruction to: obtain an index vector that is generated according to information about each node included in graph data and an element vector that is generated according to the index vector; and generate a random sequence according to the index vector and the element vector, where the random sequence reflects random walks in the graph data an element in the index vector includes an accumulated value of a degree of one or more nodes, and an element in the element vector includes an identifier of an adjacent node of a respective node.

Based on the same idea, an embodiment of the present specification further provides a non-volatile computer storage medium corresponding to FIG. 2. The non-volatile computer storage medium stores computer executable instructions which, when executed by a processor, cause the processor to: obtain information about each node included in graph data; generate an index vector according to the information about each node, where an element in the index vector includes an accumulated value of a degree of one or more nodes; generate an element vector according to the index vector, where an element in the element vector includes an identifier of an adjacent node of the node; and generate a random sequence according to the index vector and the element vector, where the random sequence reflects random walks in the graph data.

Based on the same idea, an embodiment of the present specification further provides a non-volatile computer storage medium corresponding to FIG. 6. The non-volatile computer storage medium stores computer executable instructions which, when executed by a processor, cause the processor to: obtain an index vector that is generated according to information about each node included in graph data and an element vector that is generated according to the index vector; and generate a random sequence according to the index vector and the element vector, where the random sequence reflects random walks in the graph data. An element in the index vector includes an accumulated value of a degree of one or more nodes, and an element in the element vector includes an identifier of an adjacent node of the node.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

The embodiments of this specification are all described in a progressive manner, for same or similar parts in the embodiments, refer to these embodiments, and descriptions of each embodiment focus on a difference from other embodiments. Especially, an apparatus embodiment, a device embodiment, or a non-volatile computer storage medium embodiment is basically similar to a method embodiment, and therefore is described briefly; for related parts, refer to partial descriptions in the method embodiment.

The apparatus, the device, and the non-volatile computer storage medium provided in the embodiments of this specification correspond to the method, so that the apparatus, the device, and the non-volatile computer storage medium also have beneficial technical effects similar to those of the corresponding method. Since the beneficial technical effects of the method have been described in detail above, the beneficial technical effects of the corresponding apparatus, device, and non-volatile computer storage medium are not described herein again.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of this specification, the function of the units may be implemented in a same piece of or multiple pieces of software and/or hardware.

A person skilled in the art should understand that the embodiments of this specification may be provided as a method, a system, or a computer program product. Therefore, the embodiments of this specification may use a form of hardware only embodiments, software only embodiments, or embodiments with a combination of software and hardware. Moreover, the embodiments of this specification may use a form of a computer program product that is implemented on one or more computer-usable storage media (including but not limited to a disk memory, a CD-ROM, an optical memory, and the like) that include computer-usable program code.

This specification is described with reference to the flowchart and/or block diagram of the method, device (system), and computer program product of the embodiments of this specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a persistent memory, a random-access memory (RAM) and/or a non-volatile memory of computer readable media, for example, a read-only memory (ROM) or a flash memory (RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

This specification can be described in the general context of computer-executable instructions executed by a computer, for example, a program module. Generally, the program module includes a routine, a program, an object, a component, a data structure, and the like for executing a particular task or implementing a particular abstract data type. This specification may also be practiced in distributed computing environments in which tasks are performed by remote processing devices that are connected by using a communications network. In a distributed computing environment, the program module may be located in both local and remote computer storage media including storage devices.

The embodiments of this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of this specification and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A cluster-based random walking method, comprising:
obtaining, by a cluster including a server cluster and a worker machine cluster, information about each node included in graph data by:
reading, by the worker machine cluster from a database, a degree value of each node included in the graph data, wherein each worker machine in the worker machine cluster reads degree values of respective nodes; and
reading, by each worker machine in the worker machine cluster according to an identifier of a node having a degree value that is read by the worker machine, an identifier of an adjacent node of the node from the database;
generating an index vector according to the information about each node, wherein an element in the index vector comprises an accumulated value of one or more degree values of one or more nodes;
generating an element vector according to the index vector, wherein an element in the element vector comprises an identifier of an adjacent node of a respective node; and
generating a random sequence according to the index vector and the element vector, wherein the random sequence reflects random walks in the graph data, by:
randomly determining, by a worker machine in the worker machine cluster, an identifier of one of the nodes as an identifier of a target node;
performing retrieval and calculation according to the identifier of the target node and the index vector to obtain a degree value of the target node;
randomly determining a non-negative integer less than the degree value of the target node, to represent a (non-negative integer)$^{th}$ adjacent node of the target node;
calculating an identifier of the adjacent node of the target node according to the non-negative integer and the element vector; and
iterating the performing retrieval and calculation, the randomly determining a non-negative integer, and the calculating, using the adjacent node as a target node, to generate the random sequence comprising identifiers of target nodes obtained in sequence.

2. The method according to claim 1, wherein the generating an index vector according to the information about each node comprises:
synchronizing, from the worker machine cluster to the server cluster, the degree value of each node;
generating, by the server cluster, the degree vector according to an identifier and the degree value of each node, wherein an element in the degree vector comprises a respective degree value of a respective node; and
generating, by the server cluster, the index vector according to the degree vector through accumulation calculation, wherein:
an element in the index vector is equal to a sum of a corresponding element of the elements in the degree vector and all elements before the corresponding element.

3. The method according to claim 1, wherein the generating an element vector according to the index vector comprises:
retrieving, by each worker machine according to the index vector, an identifier of a node, and inserting an array element in an array for an identifier of an adjacent node of the node to generate a part of the element vector;
synchronizing, from the worker machine cluster to the server cluster, each part of the element vector; and
generating, by the server cluster, the element vector according to each part of the element vector.

4. The method according to claim 3, wherein before the generating a random sequence according to the index vector and the element vector, the method further comprises:
synchronizing, from the server cluster to each worker machine, the index vector and the element vector.

5. The method according to claim 1, wherein:
the graph data comprises N nodes in total, an identifier of an $n^{th}$ node is n, and n starts from 0;
the randomly determining, by a worker machine in the worker machine cluster, an identifier of one of the nodes as an identifier of a target node comprises: generating, by the worker machine, any integer belonging to [0, N−1] as an identifier i of the target node;
the performing retrieval and calculation according to the identifier of the target node and the index vector to obtain a degree value of the target node comprises: performing retrieval and calculation according to a formula dgr[i]=idx[i+1]−idx[i] to obtain a degree value $D_0$ of the target node, wherein dgr[i] represents the degree value of the node with the identifier i, and idx represents the index vector;
the randomly determining a non-negative integer less than the degree value of the target node, to represent a (non-negative integer)$^{th}$ adjacent node of the target node comprises: generating any integer j belonging to [0, $D_0$−1], to represent a $j^{th}$ adjacent node of the target node; and
the calculating an identifier of the adjacent node of the target node according to the non-negative integer and the element vector comprises: calculating the identifier of the adjacent node according to a formula adj[i,j]=elem[idx[i]+j], wherein adj[i,j] represents the identifier of the $j^{th}$ adjacent node of the node with the identifier i, and elem represents the element vector.

6. The method according to claim 1, wherein the generating the random sequence comprising identifiers of target nodes obtained in sequence comprises:
when a total quantity of the target nodes obtained in sequence reaches a preset quantity of random walking steps, generating the random sequence comprising the identifiers of the target nodes obtained in sequence.

7. The method according to claim 1, wherein the generating a random sequence comprises:
generating, by each worker machine, a random sequence until a total quantity of generated random sequences reaches a specified threshold.

8. The method according to claim 1, wherein the method further comprises:
if the index vector and/or the element vector is locally unavailable in a respective worker machine, re-obtaining, by the respective worker machine, the index vector and/or the element vector from the server cluster.

9. A cluster-based random walking apparatus of a cluster that includes a server cluster and a worker machine cluster, the apparatus comprising:
at least one processor; and
a memory communicatively connected to the at least one processor, wherein the memory stores instructions executable by the at least one processor to cause the at least one processor to perform operations including:
obtaining, by the cluster, information about each node included in graph data by:

reading, by the worker machine cluster from a database, a degree value of each node included in the graph data, wherein each worker machine in the worker machine cluster reads degree values of respective nodes; and reading, by each worker machine in the worker machine cluster according to an identifier of a node having a degree value that is read by the worker machine, an identifier of an adjacent node of the node from the database;

generating an index vector according to the information about each node, wherein an element in the index vector comprises an accumulated value of one or more degree values of one or more nodes;

generating an element vector according to the index vector, wherein an element in the element vector comprises an identifier of an adjacent node of the node; and generating a random sequence according to the index vector and the element vector, wherein the random sequence reflects random walking in the graph data, by:

randomly determining, by a worker machine in the worker machine cluster, an identifier of one of the nodes as an identifier of a target node;

performing retrieval and calculation according to the identifier of the target node and the index vector to obtain a degree value of the target node;

randomly determining a non-negative integer less than the degree value of the target node, to represent a (non-negative integer)$^{th}$ adjacent node of the target node;

calculating an identifier of the adjacent node of the target node according to the non-negative integer and the element vector; and iterating the performing retrieval and calculation, the randomly determining a non-negative integer, and the calculating, using the adjacent node as a target node, to generate the random sequence comprising identifiers of target nodes obtained in sequence.

10. The apparatus according to claim 9, wherein the operations further comprise:

synchronizing, from the worker machine cluster to the server cluster, the degree value of each node;

generating, by the server cluster, the degree vector according to an identifier and the degree value of each node, wherein an element in the degree vector comprises a respective degree value of a respective node; and generating, by the server cluster, the index vector according to the degree vector through accumulation calculation, wherein:

an element in the index vector is equal to a sum of a corresponding element of the elements in the degree vector and all elements before the corresponding element.

11. The apparatus according to claim 9, wherein the operations further comprise:

retrieving, by each worker machine according to the index vector, an identifier of a node, and inserting an array element in an array for an identifier of an adjacent node of the node to generate a part of the element vector;

synchronizing, from the worker machine cluster to the server cluster, each part of the element vector; and generating, by the server cluster, the element vector according to each part of the element vector.

12. The apparatus according to claim 11, wherein before the at least one processor generates the random sequence according to the index vector and the element vector, the at least one processor further performs:

synchronizing, from the server cluster to each worker machine, the index vector and the element vector.

13. The apparatus according to claim 9, wherein the generating the random sequence comprising identifiers of target nodes obtained in sequence comprises:

when a total quantity of the target nodes obtained in sequence reaches a preset quantity of random walking steps, generating the random sequence comprising the identifiers of the target nodes obtained in sequence.

14. The apparatus according to claim 9, wherein the generating a random sequence comprises:

generating, by each worker machine, a random sequence until a total quantity of generated random sequences reaches a specified threshold.

15. The apparatus according to claim 9, wherein the method further comprises:

if the index vector and/or the element vector is locally unavailable in a respective worker machine, re-obtaining, by the respective worker machine, the index vector and/or the element vector from the server cluster.

16. A non-transitory computer-readable storage medium storing instructions executable by at least one processor to cause the at least one processor to perform operations including:

obtaining, by a cluster including a server cluster and a worker machine cluster, information about each node included in graph data, by:

reading, by the worker machine cluster from a database, a degree value of each node included in the graph data, wherein each worker machine in the worker machine cluster reads degree values of respective nodes; and reading, by each worker machine in the worker machine cluster according to an identifier of a node having a degree value that is read by the worker machine, an identifier of an adjacent node of the node from the database;

generating an index vector according to the information about each node, wherein an element in the index vector comprises an accumulated value of one or more degree values of one or more nodes;

generating an element vector according to the index vector, wherein an element in the element vector comprises an identifier of an adjacent node of the node; and generating a random sequence according to the index vector and the element vector, wherein the random sequence reflects random walks in the graph data, by:

randomly determining, by a worker machine in the worker machine cluster, an identifier of the nodes as an identifier of a target node;

performing retrieval and calculation according to the identifier of the target node and the index vector to obtain a degree value of the target node;

randomly determining a non-negative integer less than the degree value of the target node, to represent a (non-negative integer)$^{th}$ adjacent node of the target node;

calculating an identifier of the adjacent node of the target node according to the non-negative integer and the element vector; and iterating the performing retrieval and calculation, the randomly determining a non-negative integer, and the calculating, using the adjacent node as a target node, to generate the random sequence comprising identifiers of target nodes obtained in sequence.

* * * * *